(12) United States Patent
Hebenstreit

(10) Patent No.: US 6,441,321 B1
(45) Date of Patent: Aug. 27, 2002

(54) METHOD FOR CONTROLLING WEIGHT OF DIVIDED PORTIONS

(75) Inventor: Paul Hebenstreit, St. Louis, MO (US)

(73) Assignee: Creative Automation, Inc., St. Louis, MO (US)

( * ) Notice: Subject to any disclaimer, the term of this patent is extended or adjusted under 35 U.S.C. 154(b) by 0 days.

(21) Appl. No.: 09/587,133

(22) Filed: Jun. 2, 2000

(51) Int. Cl.[7] .......................... A21D 6/00; G01G 13/02; G01G 21/10

(52) U.S. Cl. .......................... 177/50; 177/116; 177/125; 177/145; 177/184; 177/189; 264/40.7; 425/140; 426/496; 222/77

(58) Field of Search ........................ 177/119, 125, 177/145, 50, 116, 184, 187, 189, 105, 98, 99; 264/40.7; 425/140; 426/496; 222/77; 141/83

(56) References Cited

U.S. PATENT DOCUMENTS

| | | | |
|---|---|---|---|
| 2,967,703 A | * 1/1961 | Jones | 177/25.18 |
| 3,805,903 A | * 4/1974 | Muskat et al. | 177/50 |
| 3,913,691 A | * 10/1975 | Powell, Jr. | 177/184 |
| 3,995,517 A | * 12/1976 | Smith | 177/119 |
| 4,038,531 A | * 7/1977 | Loe, Jr. | 425/140 |
| 4,114,707 A | 9/1978 | Del Rosso | 177/145 |
| 4,136,504 A | * 1/1979 | Yslotsky | 177/145 |
| 4,233,255 A | 11/1980 | Moon | 264/40.4 |
| 4,382,761 A | * 5/1983 | Daubenbüchel et al. | 425/140 |
| 4,494,582 A | * 1/1985 | Meyer | 141/83 |
| 4,631,021 A | 12/1986 | Hayashi | 425/140 |
| 4,692,107 A | * 9/1987 | Morikawa et al. | 425/140 |
| 4,696,329 A | * 9/1987 | Izzi | 141/83 |
| 4,762,252 A | * 8/1988 | Hyerr et al. | 222/77 |
| 4,794,996 A | * 1/1989 | Wallace et al. | 177/125 |
| 4,883,417 A | 11/1989 | Morikawa et al. | 425/140 |
| 4,902,524 A | 2/1990 | Morikawa | 426/503 |
| 4,960,601 A | 10/1990 | Cummins | 426/504 |
| 5,073,391 A | 12/1991 | De Mars et al. | 426/231 |
| 5,109,936 A | * 5/1992 | Ruppel | 177/50 |
| 5,158,792 A | 10/1992 | Morikawa et al. | 426/231 |
| 5,159,959 A | * 11/1992 | Böhm | 141/83 |
| 5,191,947 A | * 3/1993 | Peterson | 177/189 |
| 5,200,203 A | 4/1993 | Hayashi | 425/142 |
| 5,244,100 A | * 9/1993 | Regier et al. | 177/145 |
| 5,296,654 A | * 3/1994 | Farley et al. | 177/145 |
| 5,314,322 A | 5/1994 | Morikawa et al. | 425/142 |
| 5,319,160 A | * 6/1994 | Nambu | 177/25.18 |
| 6,007,236 A | 12/1999 | Maguire | 366/141 |
| 6,235,998 B1 | * 5/2001 | Brewer | 177/105 |

FOREIGN PATENT DOCUMENTS

EP 534889 * 9/1992 .................. 177/145

* cited by examiner

Primary Examiner—Randy W. Gibson
(74) Attorney, Agent, or Firm—Bryan Cave, LLP

(57) ABSTRACT

An apparatus and method for continuously producing constant weight portions of semi-solid matter, such as bread dough, from a large mass through a dividing mechanism whereby variations in the weight of each portion are minimized by providing a signal proportional to the weight of a dough portion, or group of dough portions in order to automatically adjust the rate at which dough is fed to the dividing mechanism.

41 Claims, 3 Drawing Sheets

METHOD FOR CONTROLLING WEIGHT OF DIVIDED PORTIONS

FIELD OF THE INVENTION

The described invention relates to an apparatus and method for continuously producing constant weight portions of semi-solid matter, such as bread dough, from a large mass through a dividing mechanism at high production rates, and more particularly, to such apparatus and method whereby variations in the weight of each portion are minimized by automatically adjusting the rate at which the semi-solid matter is fed to the dividing mechanism.

BACKGROUND OF THE INVENTION

Commercial dough production often involves production of large quantities of dough which are continuously divided into portions using various types of dividing mechanisms, such as a rotating knife or ram shear divider, into which dough is fed by motor driven dough feeding devices such as machine extruders, augers or pumps. In the case of dividing mechanisms which divide dough passing through the mechanism at a fixed interval, such as a rotating knife or ram shear divider, control of the portion size and therefore weight can be achieved by controlling the operating rate of the dividing mechanism by varying the frequency or speed of the motor driving the dough feeding device, such as an electrical motor powered auger or pump. Adjustments to the portion size can thus be made by varying the control voltage input to the variable frequency controller or variable speed controller for the feed motor.

A typical motor controller voltage input has a numerical voltage range from +5.0 to −5.0 volts, thus allowing the complete range of available motor speeds or frequencies to be directed by varying the control input signal over a ten volt range. Weight control of divided dough portions has been carried out by varying control voltage inputs to feeding device motors according to the weights of dough portions obtained through the use of in-motion conveyor type check-weighing systems, such as weigh belts and weigh belt feeder systems. These apparatus, however are only capable of determining a projection of the actual static weight by collecting samples of output from a weight sensor as individual dough portions as well as the section of the conveyor belt supporting the portions pass over it. Also, as the weight samples are collected, the sensor accuracy can be affected by air currents, vibration from surrounding equipment, vibrations or harmonics generated by the dough portion's movement on the conveyor and other physical effects.

Also, since it is necessary to use a weighing device with sufficient capacity to support the weight of the empty conveyor along with the weight of the dough portion to be weighed, larger capacity weight sensors must be used, which are much less sensitive than smaller weighing sensors of the same variety.

Additionally, due to the physical properties of extruded dough, it tends to adhere to any surface it contacts. To limit the amount of adhesion it is common for flour to be sifted onto the device transporting dough portions. In prolonged operation, flour may randomly accumulate in various locations along the transport mechanism, including in the area where weight measurements are taken, thus introducing errors in the weight indications.

Further, due to the semi-solid nature of raw dough, transporting dough portions by a belt conveyor requires that the plane of the initial conveyor belt be at a higher elevation than subsequent downstream conveyor belts to eliminate the possibility of the dough portion being forced downward through the transition between sets of conveyor rollers. Also, in a system employing an in-motion belt weighing mechanism, the abrupt transition of the dough portion from an upstream conveyor to the weighing conveyor can impart an impact or torsion force to the weight sensor, resulting in inaccuracies in the measured weight.

Additionally, there are physical constraints with in-motion weighing systems, including that the weighing conveyor must be of substantial length, generally at least thirty inches, which may create integration problems with existing equipment.

Another commonly used means of weighing divided dough portions involves the use of a static weigh scale, whereby an operator may randomly remove and weigh dough portions and perform a statistical calculation to determine what adjustment may be required. This method also has several disadvantages, including that substantial variations in any individual sample portions may unduly influence the adjustment and that removal of sample portions from the processing sequence may affect production efficiency.

SUMMARY OF THE INVENTION

Thus, a need remains for a system to continuously monitor and control the weight of divided dough portions at high production rates without human intervention. Preferably, such a system would minimize the variations in the weight of dough portions from a desired weight by automatically calculating and implementing precise adjustments to the controller of the dough feed mechanism that supplies the dough divider mechanism.

The present invention satisfies these needs and provides an apparatus and method for continuously monitoring the weight of divided dough portions at high production speeds, and is capable of providing correction signals proportional to the weight deviation of each dough portion or a predetermined number of portions in a sample group from the desired portion weight. The magnitude of the dough divider feed rate control adjustment signal is also configurable for the specific application requirements.

One embodiment of the present invention comprises a dough production mechanism, a dough feed mechanism, a dividing mechanism, a weighing mechanism, a weight signal processor to calculate and transmit appropriate control signals to the dough feed mechanism, a conveyor system configured to transport dough portions from the dividing mechanism to the weighing mechanism, a positioning mechanism to place dough portions on the weighing mechanism, and a propulsion mechanism which removes the portions from the weighing mechanism to a further conveyor or processing system.

The speed of the transport conveyor is variable to accommodate the range of production speeds. The conveyor bed preferably is formed in a trough shape so that as the dough portion exits from the divider mechanism, the forward motion of the conveyor forces the dough portion to the center of the conveyor belt. The conveyor preferably is equipped with flour sifters above the conveyor bed to flour the dough and prevent adhesion as it travels on the conveyor.

Each successive dough portion is placed on the weighing device by a positioning mechanism (means), which dampens the kinetic energy imparted to the dough portion by the conveyor system, thus allowing the dough portion to rest on the weighing device. The positioning means may comprise a deflector device located along the path of movement of the dough portion. When impacted by the moving dough portion, the deflector device dampens the motion of the portion by resisting displacement, such as counter forces with spring or elastomeric material resistance devices and/or the inertia or deflection of the device itself.

The weighing mechanism is preferably a freestanding device that can be positioned between the transport conveyor and a downstream processing or conveyor system. As the dough portion reaches the end of the conveyor, it impacts a suspended pivoting spring-loaded TEFLON® coated deflector plate located above the scale receptacle, thus causing the dough portion to rotate 180 degrees backwards as it falls from the end of the conveyor.

As the dough portion falls from the conveyor, the deflector plate directs the portion to the scale receptacle, which is coated with a non-stick material such as TEFLON® to prevent adhesion of the dough portion. The scale receptacle is supported by a load cell which provides an indication of the displacement of a resilient counter force due to the weight of the portion. Various types of counter forces, such as springs or elastomeric materials, can be used in the load cell. The displacement of the counter force can be measured most readily by devices which exhibit varying electrical properties under physical deformation or displacement, such as strain gages, transducers or forced motor. The analog electrical indications generated by the load cell can be converted by an analog to digital converter ("A/D") to a digital signal compatible for input to the weight signal processor. The load cell used in the weighing mechanism utilizes a load cell body or counter force that is submerged in an engineered high density fluid to provide impact cushioning and limit the post impact oscillation ("ringing") of the counter force due to the impact of the dough portion on the scale receptacle. Upon expiration of predetermined time delay interval to insure complete dampening of post-impact oscillation, a static weight of the portion is determined from the load cell indication by a weight signal processor.

After the weight signal processor converts the electrical indication generated by the load cell for the portion to a static weight datum and stores the datum, the dough portion is propelled from the scale receptacle to the downstream conveyor by a sweep paddle. The paddle is energized by a servo motor drive, solenoid or other motion control device. As the paddle begins its forward motion, air jets surrounding the scale receptacle discharge pressurized air to clear any loose flour from the scale receptacle. A vacuum collection port connected to a vacuum source collects and removes flour and other matter released from the receptacle.

Once the airborne dough portion is ejected from the scale receptacle, it impacts a second pivoting deflector plate, which forces the dough portion downward onto a downstream conveyor or other material handling device. This process is repeated for successive dough portions.

The weight signal processor compares the weight of each dough portion in each sample group to the desired dough portion weight and automatically calculates a signal which is sent to the controller of the dough pump supplying the dividing device to increase or decrease the amount of dough passing through the cutting mechanism during each cut cycle, thereby providing continuous divided dough weight monitoring and control.

BRIEF DESCRIPTION OF THE DRAWINGS

The invention will now be further described in conjunction with the drawings, in which.

The drawings are provided for illustrative purposes only and should not be used to unduly limit the scope of the invention.

DETAILED DESCRIPTION OF THE PREFERRED EMBODIMENT

Figure 1:
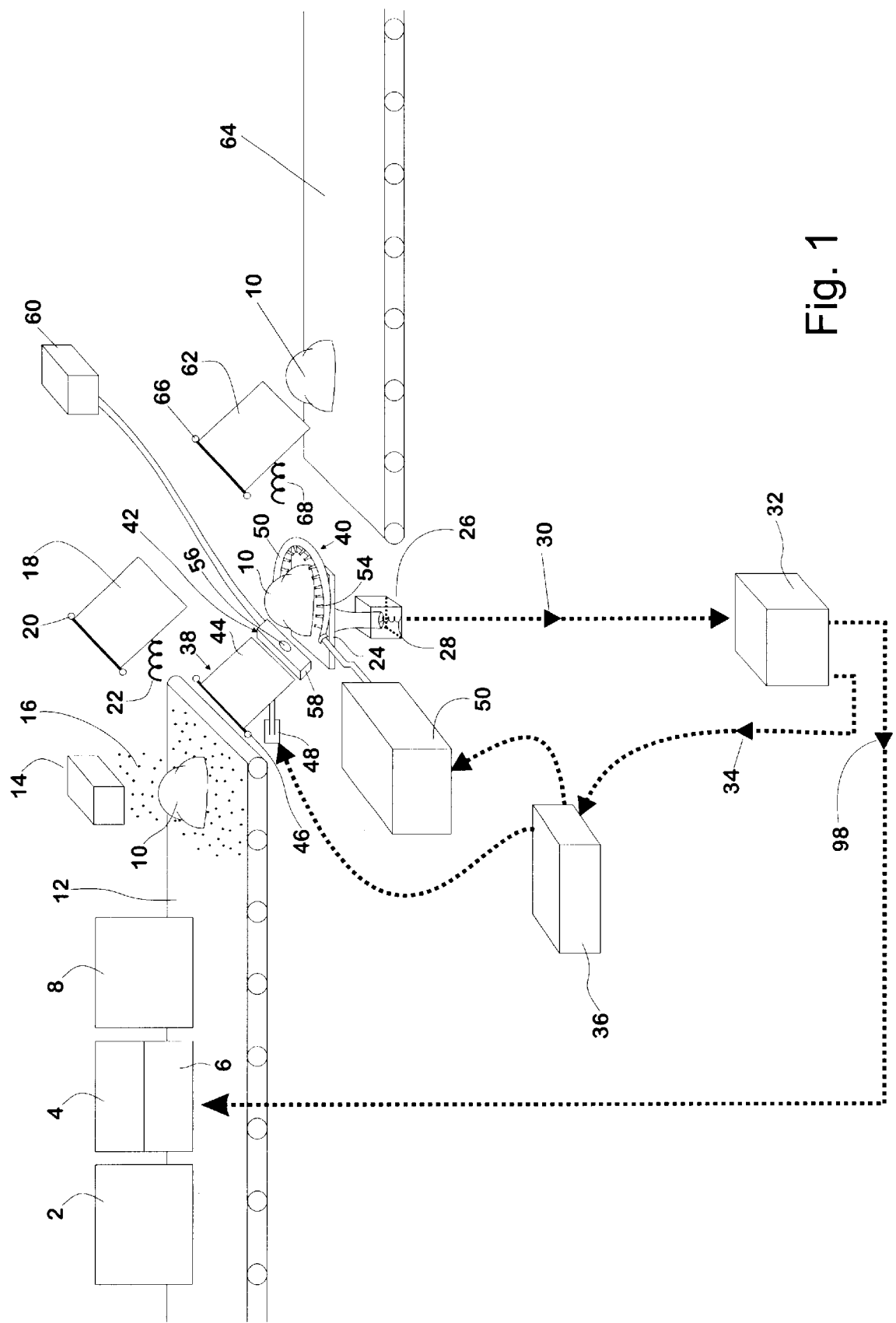
FIG. 1 is a diagram illustrating the method of one embodiment of the present invention.

FIG. 1 is an illustration of an apparatus for implementing the method of the present invention. As illustrated in FIG. 1, dough is produced in a large mass by the dough production mechanism 2. The resulting dough is then fed by a dough pumping mechanism 4 to a dough dividing mechanism 8. The dough pumping mechanism 4 consists of a pump or auger or similar device powered by a motor which is controlled by a variable frequency or variable speed controller 6. The dough dividing mechanism 8 may be of several varieties, including a machine extruder or a rotating knife, preferably of the type which operates on a predetermined time frequency. The divided portions of the dough 10 are then released from the dough dividing mechanism 8 onto a first conveyer belt 12 or other conveyer mechanism to transport the dough for weighing and further processing. A flour sifter 14 is preferably located above the conveyor belt 12 to disperse flour particles 16 along the upper surface of the conveyor belt 12 in order to prevent adhesion of the dough portions 10 to the conveyer belt 12.

As the dough portion travels past the end of the first conveyer belt 12, it is carried by its inertia into a suspended pivoting spring-loaded deflector plate 18. The deflector plate is suspended by a pivoting pin 20 and restrained by a spring 22. The deflector plate dissipates the forward momentum of the dough portion 10, thus causing it to be deposited by gravity onto the scale receptacle 24. The deflector plate 18 is preferably made of or coated with high release TEFLON® to prevent adhesion of the dough portion 10 to the deflector plate 18.

The scale receptacle is supported by a fluid restricted strain gauge load cell 26, which dampens the motion of the scale receptacle due to the downward force of the impact of the dough portion 10. This impact dampening results from the fluid restriction of dense silicon fluid, thus dampening the mechanical response of the scale receptacle to enable an accurate weight indication to be obtained from the strain gauge element 28 in the load cell 26. As is apparent to one skilled in the art, other types of impact dampening can alternatively be used to eliminate post-impact oscillation, such as other viscous fluids, resilient materials, magnetic fields, friction or pneumatic dampening.

Once the impact of the dough portion upon the scale receptacle is detected by the weight signal processor 32 from an indication 30 from the strain gauge element in the load cell 26, a predetermined time delay interval is measured by the weight signal processor 32 to insure dampening to eliminate post-impact oscillation. The predetermined time delay interval is preferably no greater than 1.0 second, and preferably no greater than 0.7 second. A typical predetermined time delay interval is approximately 0.16 second, and is of sufficient duration to eliminate post-impact oscillation.

Upon expiration of the time delay interval, the weight signal processor 32 registers an accurate dough portion weight indication 30 from the strain gauge element 28 and transmits an operation completion signal 34 signifying the completion of the weighing process to the control mechanism 36.

Upon receiving the operation completion signal 34, the control mechanism 36 initiates the operation of the dough propulsion mechanism 38, the flour discharge mechanism 40 and the flour removal mechanism 42.

The dough propulsion mechanism 38 comprises a sweep paddle 44 which is mounted on a pivoting shaft 46. The sweep paddle 44 is powered by a servo motor drive 48 or other source of activation force about the pivot shaft so as to propel the dough portion 10 from its position on the scale receptacle 24 to a downstream conveyor belt 64 for further processing operations downstream of the weighing process. Once the control mechanism 36 has initiated the operation of the sweep paddle 44 to remove the dough portion 10, the control mechanism initiates the operation of the flour discharge mechanism 40 to release accumulated flour and other matter from the scale receptacle 24. This release is accomplished by a discharge of pressurized air from a pressurized air source 50 which is directed through a discharge manifold 52 having a plurality of discharge nozzles 54. The discharge nozzles 54 are oriented to direct the air discharge across the scale receptacle 24 towards the vacuum collection port 56 in the vacuum collection manifold 58. The residual flour and other matter is drawn into the vacuum collection port 56 by the air current developed into the manifold 58 by the suction created by the vacuum source 60.

As the dough portion 10 is set in motion by the sweep paddle 44, it contacts the pivoting deflector plate 62 located above the downstream conveyor belt 64. The deflector plate is suspended by a pivoting pin 66 and restrained by a spring 68. The deflector plate dissipates the forward momentum of the dough portion 10, thus causing it to be deposited by gravity onto the downstream conveyor belt 64. The deflector plate 62 is preferably made of or coated with high release TEFLON® to prevent adhesion of the dough portion 10 to the deflector plate 62.

Figure 2:
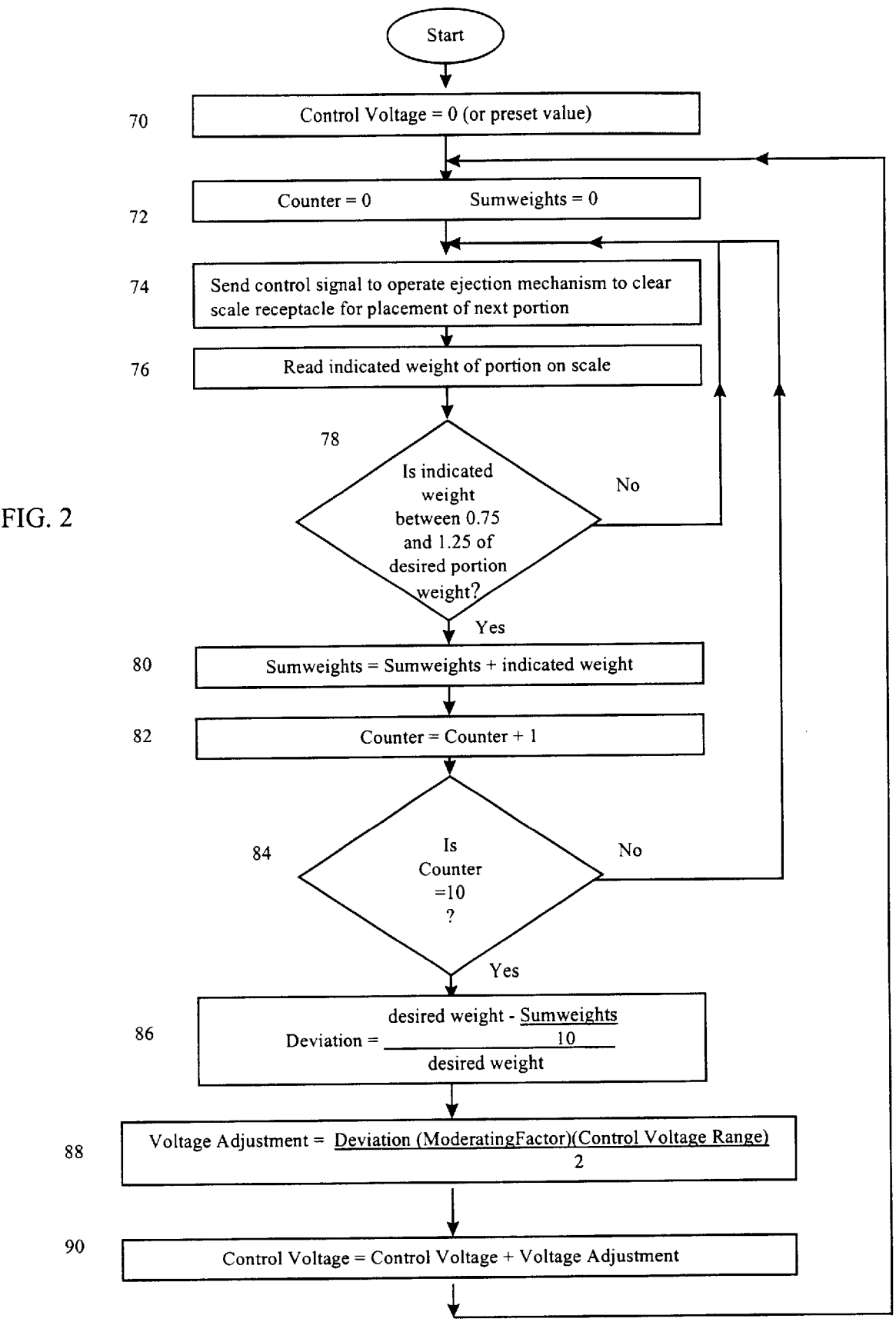
FIG. 2 is a flow chart diagram illustrating the operation of the weight signal processor of one of the present invention.

The operation of the weight signal processor 32 is further detailed in FIG. 2. As is known in the art, many types of data processing devices can be used for the weight signal processor including personal computers ("PCs"), PC programmable indicators, and recording devices. As illustrated in FIG. 2, the process starts with the initialization of the value of the dough divider feed rate control voltage (identified as 98 in FIG. 1) to zero in Step 70. This initial feed rate control voltage corresponds to the approximate mid-point of the operational range of the dough feeding device. Alternatively, a predetermined initial control voltage can be input. Next, the values of the sample size counter (Counter) register and the sum of the recorded weights for the current sample group (Sumweights) are initialized at zero in Step 72. Next, an operation completion signal 34 is sent to the control mechanism 36 (Step 74), which in turn initiates the servo motor drive 48 of the dough propulsion mechanism 38, the pressurized air source 50 of the flour discharge mechanism 40, and the vacuum source 60 of the flour removal mechanism 42. These actions advance the weighed portion for further processing and clear the scale receptacle of any flour, dough or other residual materials in preparation for receipt of the next portion of dough, which has been divided from the dough mass and deposited on the scale receptacle by gravity and/or inertia from the upstream conveyor system.

When the initial portion of dough is positioned on the scale receptacle, the weight and impact of the dough portion upon the scale receptacle are detected by the weight signal processor from an indication from the strain gauge element in the load cell, and a predetermined time delay interval is measured to insure the impact dampening function of the fluid restricted strain gauge load cell has eliminated post-impact oscillation. After the expiration of the time delay interval confirms that an accurate portion weight indication can be obtained, the analog weight indication from the strain gauge load cell is measured and converted by an analog to digital ("A/D") converter to a digital reading which can be processed by the weight signal processor (Step 76). As is known in the art, other methods of obtaining weight indications such as serial, current compensation, and ceramic capacitance may also be used.

Next, the indicated portion weight is evaluated to determine if it falls within the control range of 25% above or below the desired weight (Step 78). If the indicated weight of the portion falls outside the control range, it is considered to be aberrant or unreliable data and an operation completion signal 34 is transmitted to the control mechanism 36 (Step 74), to remove that portion from the scale receptacle and allow the next portion in the dividing sequence to be positioned on the scale receptacle (Step 74). Under this condition, after Step 74, the weight signal processor continues on to Step 76 and subsequent to read and evaluate the indicated weight of the next succeeding portion in the dividing process. As is apparent to one skilled in the art, various alternatives for disposition of portions with weights outside the control range, including further processing as with portions within the control range, providing a signal to an operator or device for recognition and/or removal of the out of range portion.

Alternatively, if the indicated weight is determined to fall within the control weight range (Step 78), the indicated portion weight is added to the cumulative indicated portion weight register for the sample group (Sumweights) (Step 80). Next, the sample size counter (Counter) is incremented to reflect the inclusion of this indicated portion weight in the sample size counter (Counter) (Step 82).

At Step 84, the Counter is evaluated to determine if the indicated weights of a complete sample size of ten have been accumulated in the Sumweights register. If not, the process continues with the transmission of an operation completion signal 34 to the control mechanism 36 (Step 78), which in turn initiates the servo motor drive 48 of the dough propulsion mechanism 38, the pressurized air source 50 of the flour discharge mechanism 40, and the vacuum source 60 of the flour removal mechanism 42. (As discussed above, these actions advance the weighed portion for further processing and clear the scale receptacle.)

Conversely, if the Counter register is equal to ten, thus indicating that a cumulative indicated weight for the complete sample size of ten has been accrued, the program calculates an average weight deviation for the sample group (Deviation) (Step 86), which is the difference between the desired portion weight and the average indicated portion weight of the sample group. A Deviation that is less than zero (average indicated weight is less than desired weight) indicates that the dough divider feed rate is insufficient to produce portions of desired weight, and therefore the feed rate needs to be increased. Conversely, a Deviation that is greater than zero (average indicated weight exceeds desired weight) indicates that the feed rate to the dough divider is excessive, thereby producing larger portions than desired, and therefore the feed rate needs to be decreased. Alternatively, for systems having a variable dividing rate and a fixed dough feed rate, the inverse of the Deviation may be used to vary the cycle rate of the dough divider means.

In order to moderate the magnitude of corrections applied to the feed rate upon completion of each sample group weight analysis, a moderating factor generally less than 1.0 and preferably approximately 0.4, is applied to the Deviation to obtain the Voltage Adjustment (Step 88) which is ultimately applied to the voltage of the control signal (98 in FIG. 1) currently input to the feed rate controller to determine the new Control Voltage (Step 90). As is apparent to one skilled in the art, the level of the moderation effect achieved by multiplying by the moderating factor can be tailored to achieve more or less substantial adjustments by varying the value of the moderating factor.

The Voltage Adjustment is determined by multiplying the Control Voltage Range, that is the difference between the upper and lower limit values of the feed rate controller input, by the product of the Deviation and the moderating Factor and dividing by 2. This produces a Voltage Adjustment value that is proportional to the Deviation and the available feed rate control range variation from the controller middle value setting.

Once the digital Control Voltage value is determined, it is converted by a digital to analog ("D/A") converter into a proportional control voltage signal 98 which is transmitted to the dough feed rate controller of the dough divider mechanism. This control voltage signal level is continuously applied to the feed rate controller until a new Voltage Adjustment is determined from the analysis of the weights of portions in the next sample group.

In essence, the present invention comprises a method of continuously dividing a mass of semisolid matter into a plurality of portions, each having a preselected target weight, comprising the steps of: 1) providing a dividing mechanism that divides the semi-solid matter into portions and a motor-driven device that feeds the semi-solid matter to the dividing mechanism, the motor-driven feeding device having an operating rate that is controlled by inputting a control signal corresponding to a numerical value ranging from an upper operating rate (at which rate portions having maximum weight are divided) to a lower operating rate (at which rate minimum weight portions are divided); 2) inputting an initial operating rate control signal to the motor-driven device; 3) dividing portions of semi-solid matter from the mass; 4) weighing each portion in a group containing a predetermined number of portions; 5) determining the average difference between the weight of each portion in the group and the predetermined target weight; and 6) adjusting the numerical value of the operating rate control signal by an amount equal to one half the difference between the numerical value of the upper operating rate control signal and the numerical value of the lower operating rate control signal, multiplied by the ratio of the average weight difference to the target weight multiplied by a predetermined moderating factor.

Figure 3:
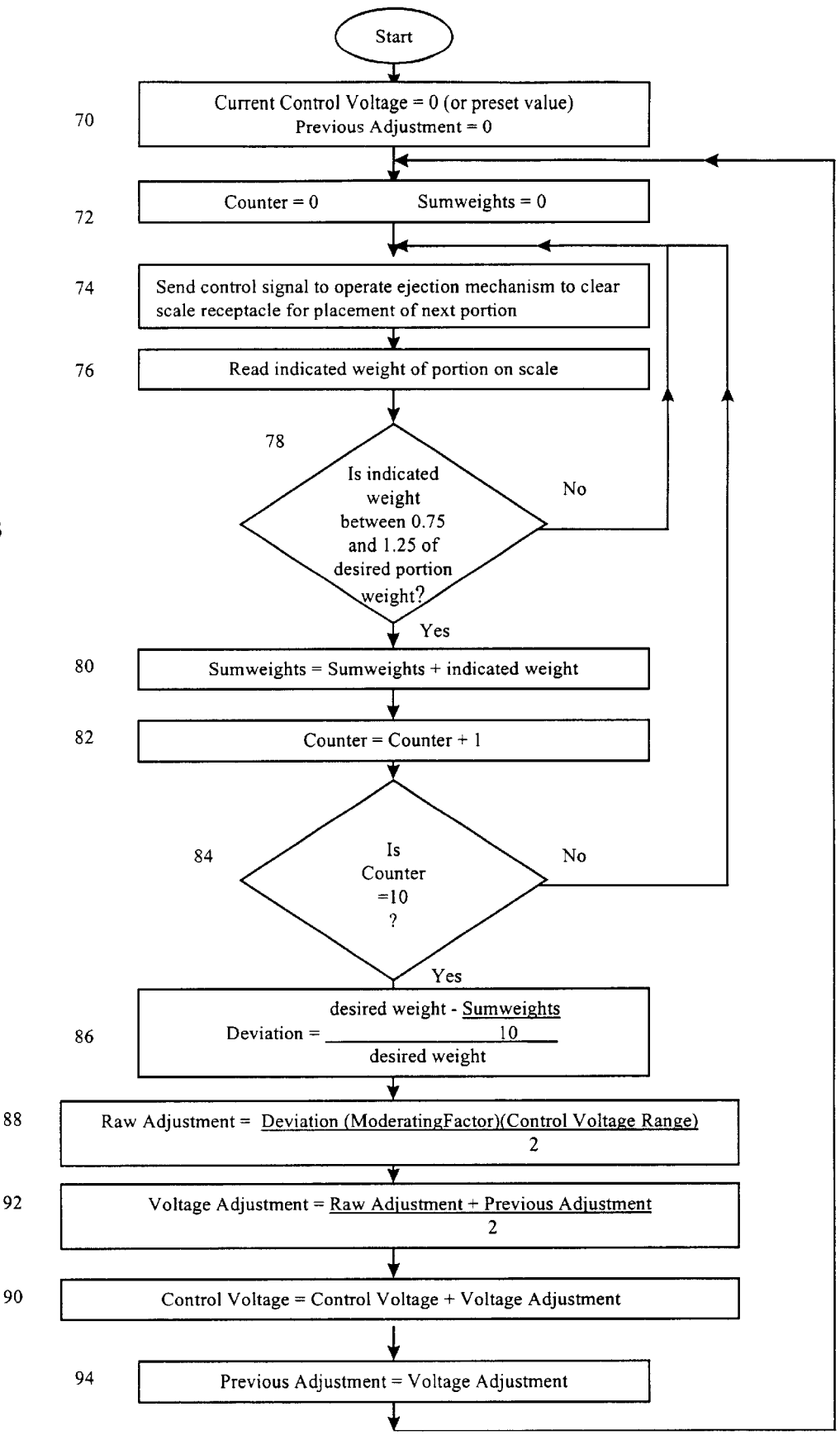
FIG. 3 is a flow chart diagram illustrating the operation of the weight signal processor of another embodiment of the present invention.

Greater moderation of the magnitude of corrections applied to the feed rate upon completion of each sample group may be achieved by averaging the Raw Voltage Adjustment for the current sample group (computed in Step 88) with the Previous Voltage Adjustment computed for the previous sample group to determine the actual Voltage Adjustment which is then applied to the Control Voltage signal. This approach is depicted in FIG. 3, which is a flow chart illustrating the operation of the weight signal processor of another embodiment of the present invention. As illustrated in FIG. 3, steps 70 through 90 are essentially identical to the process described in FIG. 2. As illustrated in FIG. 3, upon determination of the Raw Voltage Adjustment for the current sample group (Step 88) it is averaged with the Previous Voltage Adjustment computed for the previous sample group (Step 92) to determine the actual Voltage Adjustment applied to the existing Control Voltage signal (Step 90). Once determined, this digital Control Voltage value is converted by a digital to analog ("D/A") converter into a proportional control voltage signal 98 which is transmitted to the dough feed rate controller of the dough divider mechanism. Finally, in Step 94, the actual Voltage Adjustment value is stored in the Previous Adjustment register for calculation of the new actual Voltage Adjustment for the next sample group.

As is apparent to one skilled in the art, the moderation effect achieved by averaging the Raw Adjustment for the current sample group with the Voltage Adjustment computed for the previous sample, can be further enhanced by including the Voltage Adjustments for two or more immediately preceding sample groups in the averaging calculation used to generate the actual Voltage Adjustment used to determine the new Control Voltage signal provided to the controller.

Although the subject invention has been described in use primarily with respect to bread dough, the invention is applicable to many other production processes involving controlled weight portions of semi-solid matter, including but not limited to agricultural and food products, polymers, plastics, resins, cellulose, gelatins, refractory products, ceramics and the like. Many changes, modifications, variations, combinations, subcombinations and other uses and applications of the subject invention will be and become apparent to those skilled in the art after considering this specification and the accompanying drawings, which disclose a preferred embodiment thereof. All such changes, modifications, variations, and other uses and applications that do not depart from the spirit and scope of the invention are deemed to be covered by the invention, which is to be limited only by the claims which follow.

What is claimed is:

1. A method of continuously dividing a mass of semi-solid matter into a plurality of portions, each portion having a preselected target weight, comprising the steps of:

providing a dividing mechanism that divides the semi-solid matter into portions and a motor-driven device that feeds the semi-solid matter to the dividing mechanism and has an operating rate that is controlled by inputting a control signal corresponding to a numerical value;

inputting an initial operating rate control signal to the motor-driven device;

dividing a portion of semi-solid matter from the mass using the dividing mechanism;

transporting the portion from the dividing mechanism using a conveyor system;

placing the portion on a stationary weighing mechanism using a positioning mechanism which dissipates momentum of the portion;

weighing the portion;

removing the portion from the weighing mechanism using a propulsion mechanism;

determining the difference between the weight of the portion and the predetermined target weight; and adjusting the operating rate control signal of the motor-driven device according to the weight difference.

2. A method of continuously dividing a mass of semi-solid matter into a plurality of portions, each portion having a preselected target weight, comprising the steps of:

providing a dividing mechanism that divides the semi-solid matter into portions and a motor-driven device that feeds the semi-solid matter to the dividing mechanism and has an operating rate that is controlled by inputting a control signal corresponding to a numerical value;

inputting an initial operating rate control signal to the motor-driven device;

dividing portions of semi-solid matter from the mass using the dividing mechanism;

transporting the portions from the dividing mechanism using a conveyor system;

placing the portions on a stationary weighing mechanism using a positioning mechanism which dissipates momentum of the portion;

weighing each portion in a group containing a predetermined number of portions;

removing the portions from the weighing mechanism using a propulsion mechanism;

determining the difference between the average weight of the portions and the predetermined target weight; and adjusting the operating rate control signal of the motor-driven device according to the weight difference.

3. A method of continuously dividing a mass of semi-solid matter into a plurality of portions, each portion having a preselected target weight, comprising the steps of:

providing a dividing mechanism that divides the semi-solid matter into portions and a motor-driven device that feeds the semi-solid matter to the dividing mechanism and has an operating rate that is controlled by inputting a control signal corresponding to a numerical value, the motor-driven device having an upper operating rate corresponding to an upper operating rate control signal, at which rate portions having maximum weight are divided, and a lower operating rate corresponding to a lower operating rate control signal, at which rate minimum weight portions are divided;

inputting an initial operating rate control signal to the motor-driven device;

dividing portions of semi-solid matter from the mass using the dividing mechanism;

weighing each portion in a group containing a predetermined number of portions;

determining the average difference between the weight of each portion in the group and the predetermined target weight; and adjusting the numerical value of the operating rate control signal by an amount equal to one half the difference between the numerical value of the upper operating rate control signal and the numerical value of the lower operating rate control signal, multiplied by the ratio of the average weight difference to the target weight multiplied by a predetermined moderating factor.

4. The method of claim 3 wherein the predetermined moderating factor is one.

5. The method of claim 3 wherein the predetermined moderating factor is a fractional number between zero and one.

6. The method of claim 5 wherein the operating rate of the motor-driven device has an approximately linear relationship to the numerical value of the input operating rate control signal.

7. The method of claim 5 wherein the group of a predetermined number of portions is limited to portions having a weight within a predetermined weight range.

8. The method of claim 7 where portions having a weight outside the predetermined weight range are identified.

9. The method of claim 8 wherein the identified portions are conveyed to a first location and portions within the predetermined weight range are conveyed to a second location.

10. The method of claim 7 wherein the predetermined weight range is 75–125% of the predetermined target weight.

11. The method of claim 5 wherein the predetermined number of portions in the group is one.

12. The method of claim 5 wherein the initial operating rate control signal has a numerical value equal to the sum of the numerical value of the lower operating rate control signal and one half the difference between the numerical value of the upper operating rate control signal and the numerical value of the lower operating rate control signal.

13. The method of claim 3 wherein the step of weighing each portion in a group containing a predetermined number of portions is performed by apparatus comprising a weighing means and positioning means in proximity to the weighing means so as to direct the portion from the dividing mechanism to the weighing means.

14. The method of claim 3 wherein the step of weighing each portion in a group containing a predetermined number of portions is performed by placing a portion on a weighing means, measuring a predetermined time delay interval, and then weighing the portion.

15. The method of claim 14 wherein the predetermined time delay interval is between 0 and 1.0 seconds.

16. The method of claim 3 wherein the step of weighing each portion in a group containing a predetermined number of portions is performed by apparatus comprising a device which exhibits varying electrical properties under an applied load.

17. The method of claim 3 wherein the step of weighing each portion in a group containing a predetermined number of portions is performed by apparatus comprising a fluid restricted strain gauge load cell.

18. The method of claim 3 wherein the step of weighing each portion in a group containing a predetermined number of portions is performed by apparatus comprising a weighing means and a propulsion means, which removes the portion from the weighing means, and wherein a processing means is used to register an indication of the portion weight from the weighing means and thereafter transmit a signal that initiates the operation of the propulsion means.

19. The method of claim 18 wherein the propulsion means comprises a powered paddle positioned in proximity to the weighing means so as to propel the portion from the weighing means.

20. The method of claim 19 wherein the propulsion means further comprises a conveyor means downstream from the weighing means and a deflector plate in proximity to the downstream conveyor means to position the propelled portion on the downstream conveyor means.

21. The method of claim 20 wherein the apparatus further comprises a source of pressurized fluid communication with at least one discharge nozzle oriented to direct a discharge of fluid across the surface of the weighing means and wherein the processing means initiates the discharge of pressurized fluid from the source through the nozzle.

22. The method of claim 3 wherein the step of weighing each portion in a group containing a predetermined number of portions is performed by apparatus comprising a weighing means having a surface for receiving the portion to be weighed, and a source of pressurized fluid in fluid communication with at least one discharge nozzle oriented to direct a discharge of fluid across the surface of the weighing means.

23. The method of claim 22 wherein the pressurized fluid is air.

24. The method of claim 23 wherein the apparatus further comprises a source of vacuum in fluid communication with a manifold having a port oriented to receive the discharge of pressurized fluid across the surface of the weighing means.

25. The method of claim 3 wherein the step of weighing each portion in a group containing a predetermined number of portions is performed by apparatus comprising a weighing means having a surface for receiving the portion to be weighed, and a source of vacuum in fluid communication with a manifold having a port in proximity to the surface of the weighing means.

26. An apparatus for producing a plurality of portions of semi-solid matter, each portion having a substantially uniform preselected target weight, comprising:

means for producing the semi-solid matter, receptacle for receiving the output of the production means having an outlet, means adjacent to said outlet for feeding the matter to a dividing means at a rate which varies in response to a control signal, a dividing means downstream from the feeding means for dividing said matter into portions, weighing means downstream from said dividing means for receiving said portions and producing indications representative of the weights of said portions, positioning means between said dividing means and said weighing means for successively placing said portions on the weighing means, propulsion means adjacent said weighing means for removing said portions from the weighing means, and processing means in communication with the matter feeding means and weighing means for providing an operating rate control signal to the matter feeding means, receiving indications representative of said portion weights from the weighing means, converting said indications into portion weights, determining the average difference between the weights of a group of a predetermined number of portions in the group and the predetermined target weight, and adjusting the operating rate control signal based upon the ratio of the average weight difference to the target weight.

27. The apparatus of claim 26 further comprising conveyor means adapted for receiving said portions from said propulsion means and conveying said portions and wherein the propulsion means are adapted for supplying said portions to said conveyor means.

28. An apparatus for controlling the operating rate of a motor-driven device that feeds semi-solid matter to a dividing means which divides the semi-solid matter into portions and which motor-driven device has an operating rate that is controlled by inputting a control signal corresponding to a numerical value, so that each portion has a substantially uniform predetermined target weight, comprising:

weighing means downstream from said dividing means for receiving said portions and producing indications representative of the weights of said portions, positioning means between said dividing means and said weighing means for successively placing said portions on the weighing means, propulsion means adjacent said weighing means for removing said portions from the weighing means, and processing means in communication with the motor-driven device and weighing means for providing an operating rate control signal having an initial numerical value to the device, receiving indications representative of said portion weights from the weighing means, converting said indications into portion weights, determining the average difference between the weights of a group of a predetermined number of portions and the predetermined target weight, and adjusting the operating rate control signal based upon the ratio of the average weight difference to the target weight.

29. An apparatus for controlling the operating rate of a motor-driven device that feeds semi-solid matter to a dividing means which divides the semi-solid matter into portions and which motor-driven device has an operating rate that is controlled by inputting a control signal corresponding to a numerical value, and which motor-driven device has an upper operating rate, at which rate portions having a maximum weight are divided, and a lower operating rate, at which rate portions having a minimum weight are divided, so that each portion has a substantially uniform predetermined target weight, comprising:

weighing means downstream from said dividing means for receiving said portions and producing indications representative of the weights of said portions, positioning means between said dividing means and said weighing means for successively placing said portions on the weighing means, propulsion means adjacent said weighing means for removing said portions from the weighing means, and processing means in communication with the motor-driven device and weighing means for providing an operating rate control signal having an initial numerical value to the device, receiving indications representative of said portion weights from the weighing means, converting said indications into portion weights, determining the average difference between the weights of a group of a predetermined number of portions and the predetermined target weight, and adjusting the numerical value of the operating rate control signal by an amount equal to one half the difference between the numerical value of the upper operating rate control signal and the numerical value of the lower operating rate control signal, multiplied by the ratio of the average weight difference to the target weight multiplied by a predetermined moderating factor.

30. The apparatus of claim 29 wherein the weighing means comprises a device which exhibits varying electrical properties under an applied load.

31. The apparatus of claim 29 wherein the weighing means comprises a fluid restricted strain gauge load cell.

32. The apparatus of claim 29 wherein the positioning means comprises a deflector plate positioned in proximity to the weighing means so as to direct the portion from the dividing mechanism to the weighing means.

33. The apparatus of claim 29 wherein the processing means measures a predetermined time delay interval following receiving a portion weight indication from the weighing means prior to converting the indication into a portion weight.

34. The apparatus of claim 29 wherein the predetermined time delay interval is between 0 and 1.0 seconds.

35. The apparatus of claim 29 wherein the processing means transmits a signal which initiates the operation of the propulsion means upon registering a portion weight indication from the weighing means.

36. The apparatus of claim 29 wherein the propulsion means comprises a powered paddle positioned in proximity to the weighing means so as to propel the portion from the weighing means.

37. The apparatus of claim 29 further comprising a conveyor means downstream from the propulsion means and wherein the propulsion means further comprises a deflector plate located above the downstream conveyor means.

38. The apparatus of claim 29 wherein the weighing means has a surface for receiving the portion to be weighed, and a source of pressurized fluid in fluid communication with a plurality of discharge nozzles oriented to direct a discharge of fluid across the surface of the weighing means.

39. The apparatus of claim 38 wherein the processing means initiates the discharge of pressurized fluid from the source through the nozzles.

40. The apparatus of claim 38 wherein the pressurized fluid is air.

41. The apparatus of claim 38 further comprising a source of vacuum in fluid communication with a manifold having a port oriented to receive the discharge of pressurized fluid across the surface of the weighing means.

* * * * *